May 21, 1963 O. W. LUEK ETAL 3,090,477
BALE CONVEYOR
Filed Oct. 5, 1960
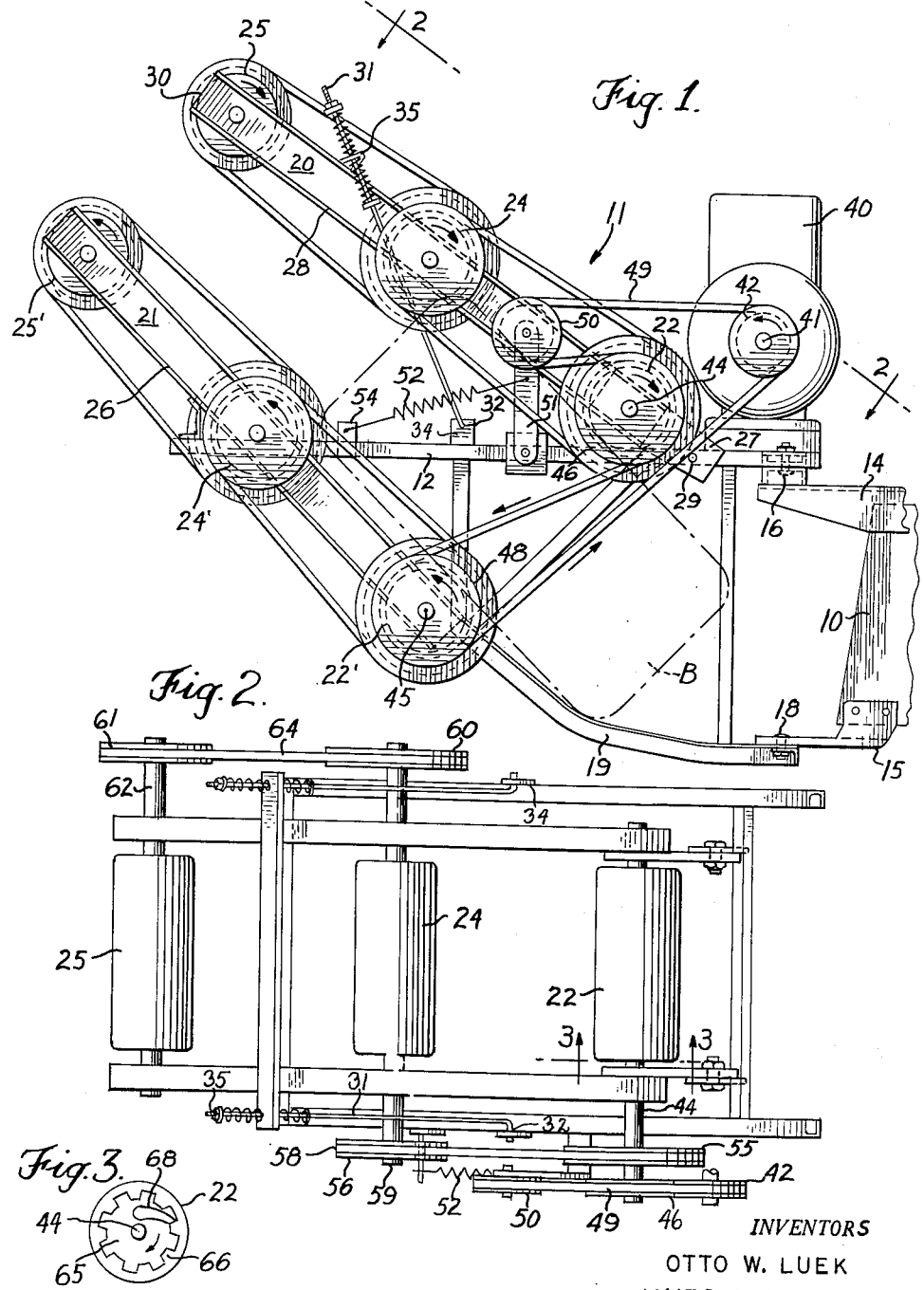
INVENTORS
OTTO W. LUEK
JAMES H. HOLLYDAY
Joseph A. Brown
ATTORNEY

United States Patent Office 3,090,477
Patented May 21, 1963

3,090,477
BALE CONVEYOR
Otto W. Luck and James H. Hollyday, New Holland, Pa., assignors to Sperry Rand Corporation, New Holland, Pa., a corporation of Delaware
Filed Oct. 5, 1960, Ser. No. 60,717
2 Claims. (Cl. 198—128)

This invention relates to a bale conveyor connected to the discharge end of a hay baler and operable to throw each emerging bale into a trailing wagon.

Heretofore, a bale thrower has been provided comprising a pair of endless conveyors mounted one above the other at the discharge end of a baler and between which each emerging base passes. Each conveyor comprises rollers which operate continuously, having bale engaging friction surfaces which impart velocity to each emerging bale. Of the series of rollers used on the conveyors, the first bale engaging roller of each conveyor has the greatest rotatable movement relative to the bale to be thrown. There is less relative movement between subsequent rollers and the bale since the bale progressively increases in velocity as it moves through the thrower. Therefore, there is a greatest loss of work at the first bale engaging roller of each conveyor, and progressively less towards the last bale engaging roller.

One object of this invention is to provide a bale thrower of the character described which will operate more efficiently and with less work loss than similar throwers of prior design.

Another object of this invention is to provide a bale thrower having a pair of cooperative endless conveyors which progressively increase the velocity of a bale to be thrown, successive bale engaging conveyor rollers of each conveyor operating at progressively increased speeds from a first to a last bale engaging roller, and means being provided for preventing the slower rollers from exerting a drag on the bale.

Another object of this invention is to provide a bale thrower of the character described having rollers driven by overrunning means to prevent drag by slower rollers when the bale is engaged by faster rollers.

A further object of this invention is to provide a bale thrower having a pair of bale engaging cooperative endless conveyors, the relative movement between each conveyor and the bale thrown being held to a minimum whereby wear and tear on the conveyor is minimized.

Other objects of this invention will be apparent hereinafter from the specification and from the recital in the appended claims.

In the drawings:
FIG. 1 is a side elevation of a bale thrower constructed according to this invention;
FIG. 2 is a plan view of FIG. 1; and
FIG. 3 is a section taken on the line 3—3 of FIG. 2 looking in the direction of the arrows.

Referring now to the drawings by numerals of reference, and first to FIGS. 1 and 2, 10 denotes the bale case of a hay baler from which bales B successively emerge. Mounted on bale case 10 and operable to throw each emerging bale to a trailing wagon, not shown, is a bale thrower 11. Thrower 11 comprises a frame structure 12 having brackets 14 and 15 bolted to the top and bottom, respectively, of the bale case. The structure connecting the thrower to the baler includes aligned pivots 16 and 18 which provide a vertical axis about which the thrower is laterally swingable.

The thrower includes a base plate 19 which extends rearwardly and upwardly from adjacent the bottom of the bale case 10 to guide and direct each emerging bale in an upward direction. When the bale has substantially emerged from the baler it is engaged by upper endless conveyor 20 and lower endless conveyor 21. These conveyors engage the top and bottom, respectively, of each bale. Each conveyor comprises a plurality of bale engaging rollers, the upper conveyor having a first roller 22, a second roller 24 and a third roller 25. The corresponding rollers of the lower conveyor are denoted 22', 24' and 25'. The rollers in lower conveyor 21 are identical with the rollers in upper conveyor 20.

The rollers of lower conveyor 21 are supported on a frame 26 fixedly carried on the framework 12 of the thrower. The lower, forward roller 22' has a periphery which projects slightly above the surface of the plate 19 to engage and slightly lift the lower forward portion of each emerging bale. Upper endless conveyor 20 has a frame 28, the lower forward end 27 of which is pivotally connected at 29 to the frame 12. The upper rearward end 30 of the conveyor 20 is swingable in a vertical plane about the pivotal axis 29. The at-rest extension of the upper conveyor 20 is determined by support rods 31 pivotally connected at 32 to bracket members 34. The upper end of each rod 31 is connected to conveyor 20 by double acting spring means 35. While the rods 31 limit downward pivoting movement of the upper conveyor 20, they allow it to swing upwardly about the transverse pivot axis 29.

The first rollers 22 and 22' of the upper and lower conveyors, respectively, are spaced apart a distance approximately equal to the distance between the top and bottom of each emerging bale. These rollers rotate continuously in opposite directions, the roller 22 rotating in a clockwise direction when viewed as shown in FIG. 1 and the roller 22' rotating in a counterclockwise direction. The rollers 24 and 25 also rotate continuously in a clockwise direction while the rollers 24' and 25' rotate counterclockwise.

All of the rollers of both conveyors are power driven. The power is derived from a variable speed engine 40 having an output shaft 41 on which a pulley 42 is mounted. The shafts 44 and 45 for rollers 22 and 22' respectively, have pulleys 46 and 48 connected thereto. An endless belt 49 extends around pulley 42 and around pulleys 46 and 48. A belt tightener 50 is provided for keeping the belt 49 tight. Tightener 50 is supported on a pivoted lever arm 51 biased towards a tightening position by a spring 52 interconnected between the lever arm 51 and a bracket 54 on frame 12. The pulleys 46 and 48 drive through the shafts 44 and 45 to rotate the rollers 22 and 22'. To drive the other rollers of the conveyors, each conveyor is provided with drive means as shown best in FIG. 2. While the drive for rollers 24 and 25 is shown for the upper conveyor 20 only, it will be understood that the lower conveyor rollers are similarly driven. Keyed to shaft 44 is a pulley 55 which operates to drive a pulley 56 through an endless belt 58. The pulley 56 is connected to the shaft 59 of roller 24. The opposite end of shaft 59 has a pulley 60 which is connected to a pulley 61 on the shaft 62 of roller 25 by belt 64.

All of the rollers on both conveyors are of the same diameter. However, they are driven at different speeds. The pulley arrangement is such that rollers 24 and 24' rotate at one and one half times the speed of rollers 22 and 22'. Rollers 25 and 25' are driven at twice the speed of rollers 22 and 22'. Therefore, the rollers 24—24' rotate faster than rollers 22—22', while the rollers 25—25' rotate faster than rollers 24—24'. As a result, when each bale emerges from bale case 10, it is engaged by the continuously operating, cooperative endless conveyors 20 and 21 which impart a gradually increased velocity to each bale.

When each bale emerges from bale case 10, it is first engaged by the rollers 22 and 22'. Since these rollers are rotating at the slowest speed of the conveyor, they gradually impart velocity to the bale. By the time the bale reaches the rollers 24 and 24', it has increased in speed. Rollers 24 and 24', rotating more rapidly than rollers 22 and 22' add additional velocity to the bale. The speed of the bale picks up still further and it is engaged finally by the rollers 25 and 25' which are rotating at the highest speed and provide the last increase in throwing speed to the bale. By having the bale engaging rollers operating at different speeds, which progressively increases from the first bale engaging rollers to the last bale engaging rollers, a progressively increasing velocity is applied to each bale thrown. This reduces the amount of movement of the rollers 22 and 22' relative to the bale as well as the rollers 24 and 24'. The reduction of this relative movement results in less leaf loss from the bales thrown and greater efficiency is achieved with less power.

As shown in FIG. 1, the length of bale B is such that at one stage it is engaged by rollers 24—24', as well as rollers 22—22'. Since rollers 24—24' are rotating faster than rollers 22—22' and increase the velocity of the bale, the bale may attain a velocity greater than the speed of rollers 22—22' while still in engagement with rollers 22—22'. This would tend to "drag" or resist velocity increase of the bale. The same occurs in the relationship of rollers 25—25' and rollers 24—24', since rollers 25—25' are rotating at a higher speed than rollers 24—24'. To obviate this problem, rollers 22, 22', 24 and 24' are provided with clutches interposed between the drive means and the rollers to allow the rollers to overrun the drive. The clutch of roll 22 is shown in FIG. 3, it being understood that the rolls 22', 24 and 24' have similar clutches.

Roll 22 has an annular pocket 65 into which ratchet teeth 66 project. A pawl 68 is pivotally mounted on shaft 45 for engagement with teeth 66. Spring means, not shown, is provided to bias the pawl into engagement with the ratchet teeth. Roll 22 is driven as indicated by the arrow. It will be apparent that if the speed of roll 22 increases because of bale engagement to the point where it exceeds the speed of shaft 45, the roll will overrun and pivot pawl 68 inwardly against the resistance of the spring means.

With this structure, each bale is progressively increased in velocity and relative movement between the rolls and the bale to be thrown is minimized. Further, since rolls 22, 22', 24 and 24' are driven through overrunning clutch means, the slower rolls do not exert a drag on the bale when it speed up responsive to engagement with faster rolls.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention, what we claim is:

1. A bale thrower mountable on the discharge end of a hay baler to receive discharged bales and traject them distantly from the baler, said thrower comprising an upper and a lower conveyor co-extensive and engageable respectively with the top and bottom sides of each bale discharged from the baler, each conveyor having a plurality of high speed power driven rollers spaced relative to each other and successively engageable with each bale and including a first roller adjacent the baler and at least one other roller more remote therefrom, means rotating the first roller in each conveyor at a given speed and the other roller of each conveyor at a faster speed whereby to progressively increase the application of throwing force to each bale, the space between said first roller and said remote roller of each conveyor being such relative to the lengths of said discharged bales that when the bales engage the remote rollers portions of the bales are in engagement with the first rollers, the rollers in the upper conveyor being driven at substantially the same speed as the corresponding rollers in the lower conveyor and both conveyors cooperating in imparting a throwing force to each bale, and means interposed between said rotating means and said first roller of each conveyor permitting the first rollers to overrun the rotating means to thereby prevent the first rollers from retarding the throwing effect exerted on each bale by the second rollers.

2. A bale thrower as recited in claim 1 wherein said interposed means comprises an overrunning clutch in the form of pawl and ratchet means.

References Cited in the file of this patent

UNITED STATES PATENTS

| | | |
|---|---|---|
| 650,410 | Morin | May 29, 1900 |
| 1,712,576 | McArthur | May 14, 1929 |
| 1,821,617 | Cone | Sept. 1, 1931 |
| 2,744,616 | Shields | May 8, 1956 |